United States Patent Office 2,721,855
Patented Oct. 25, 1955

2,721,855

AIR-DRYING ORGANOSILICON COMPOSITIONS CONTAINING A TITANIC ACID ESTER

Myron Kin, Midland, Mich., assignor to Dow Corning Corporation, Midland, Mich., a corporation of Michigan No Drawing. Application March 16, 1953,
Serial No. 342,739

6 Claims. (Cl. 260—46.5)

This invention relates to air-drying organosilicon-titanium compositions.

Ever since the advent of organosilicon resins, attempts have been made to prepare a satisfactory organo-silicon coating composition which would air-dry to a durable film at room temperature in less than 8 hours. Prior attempts to produce such a composition resulted in materials which were either too soft when dry or would craze upon standing or were not as thermally stable as pure organosilicon resins (i. e. silicone resins modified with various organic resins). The present invention has solved the problem without the above disadvantages.

It is the object of this invention to provide an air-drying organosilicon composition which does not craze upon standing and produces a hard durable film when dry. Another object of this invention is to provide a material which may be used for treatment of electrical insulators. Another object is to provide a material which may be employed for rendering masonry water repellent. Further objects and advantages will be apparent from the following description.

This invention relates to a composition of matter comprising (1) a benzene soluble polymeric organosilicon compound having on the average from .9 to 1.5 monovalent hydrocarbon radicals per silicon atom and on the average from .1 to 1.5 alkoxy groups per silicon atom, in which compound at least a major portion of the polymer linkages between the silicon atoms are SiOSi linkages, the remaining polymer linkages, if any, being SiSi or SiRSi linkages, and (2) from .02 to 1.5 per cent by weight titanium based on the weight of the organosilicon compound, the titanium being in the form of a benzene soluble ester of titanium and an aliphatic alcohol of less than 20 carbon atoms.

The organosilicon compositions employed in this invention are polymeric materials having monovalent hydrocarbon radicals and alkoxy radicals attached to the silicon atoms. In some of the materials all of the polymer linkages are SiOSi linkages, while in others some of the polymer linkages are SiOSi and the remainder are SiSi (silane) linkages and/or SiRSi (silcarbane) linkages. In the latter R can be any divalent hydrocarbon radical such as, for example, methylene, ethylene, propylene or phenylene.

The compositions of this invention can have any alkoxy group and any monovalent hydrocarbon radical attached to the silicon atoms thereof. Thus, the alkoxy radicals can be, for example, methoxy, isopropoxy or stearyloxy while specific examples of operative monovalent hydrocarbon radicals are methyl, ethyl, octadecyl, stearyl, allyl, vinyl, cyclohexyl, phenyl, tolyl, cyclohexenyl, benzyl and xenyl. Preferably, the monovalent hydrocarbon radicals are alkyl radicals of less than 5 carbon atoms. It is also preferred that the alkoxy radicals contain less than 5 carbon atoms.

The alkoxylated organosilicon compounds of this invention may be prepared by conventional methods for preparing such compounds. For example, those polymers in which all of the polymer links are siloxane linkages can be prepared by partially hydrolyzing the corresponding alkoxy silanes of the formula $R'_nSiX_{4-n}$, where $R'$ is a monovalent hydrocarbon radical and X is an alkoxy group, or they may be prepared by partially alkoxylating chlorosilanes of the formula $R'_nSiCl_{4-n}$ by reacting them with alcohols and thereafter removing the remaining chlorine by selective hydrolysis. The compositions of this invention which contain SiSi linkages and SiRSi linkages may be prepared by partially hydrolyzing mixtures of alkoxylated silanes of the formula $R'_nSiX_{4-n}$ and alkoxylated polysilanes and/or alkoxylated silcarbanes.

Another source of the materials which contain all three linkages is the distillation residue obtained from various processes of preparing organochlorosilanes. For example, the reaction of methylchloride with silicon gives an appreciable amount of a high boiling material which is a complex mixture of alkylchlorosilane monomers, alkylated chloropolysilanes and alkylated chlorosilcarbanes in which the silcarbane linkages are formed of alkylene radicals. A similar residue results from the reaction of benzene with trichlorosilane except that in the latter case the various components are phenylated and the silcarbane linkages are formed of phenylene radicals. One method by which these residues can be converted to the materials of this invention is by replacing part of the chlorine with alkoxy groups and then removing the remaining chlorine by hydrolysis.

Any benzene soluble titanium ester of the above defined aliphatic alcohols can be employed in this invention. It is to be understood that this invention includes both monomeric esters in which there are four hydrocarbonoxy radicals per titanium atom (Ti[OR]4) and polymeric materials containing less than four said radicals per titanium atom. The polymers can be partially hydrolyzed esters which contain

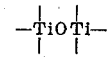

linkages and esters of titanium and polyhydric alcohols which contain linkages of the type

Specific examples of titanium esters which are operative in this invention are esters of monohydric alcohols such as methyl, ethyl, allyl, isopropyl, cyclohexyl, octyl and octadecyl alcohols; esters of dihydric alcohols such as ethylene glycol, propylene glycol, octylene glycol, diethylene glycol, tripropylene glycol and tetraethylene glycol and esters of trihydric alcohols such as glycerine.

In preparing the compositions of this invention, the organosilicon composition and the titanium ester are mixed in any convenient manner. In general, it is preferable to employ mutual solvents such as benzene, toluene, xylene and petroleum hydrocarbon solvents.

When the compositions of this invention are applied to surfaces, they will dry to a tack-free state at room temperature in a matter of from ½ to 8 hours depending upon the amount of titanium ester present. The resulting films do not craze upon standing and are sufficiently hard and stable to be useful for coating ceramic electrical insulators, and other surfaces. The compositions can be applied to surfaces in any convenient manner such as by spraying, brushing or dipping.

If desired, non-alkoxylated organosilicon compositions may be added to the compositions of this invention in order to improve specific properties. Also the compositions may contain fillers, pigments and other additives which are normally employed in paints.

It has been found that the drying time of the above compositions is further reduced when they are exposed to ammonia.

The following examples are illustrative only and are not to be construed as limiting the invention which is properly delineated in the appended claims.

*Example 1*

The organosilicon composition employed in this example was prepared from a liquid material boiling above 70° C. at 760 mm., which was obtained from the reaction of methylchloride with silicon. The composition of the material was as follows:

4.4% methylchlorosilanes of the formula $Me_nSiCl_{4-n}$,
27% higher alkyl chlorosilanes of the formula $$R_nSiCl_{4-n}$$

6.1% disiloxanes of the formula $Me_nSi_2OCl_{6-n}$,
4.4% hexachlorodisiloxane
8.8% methylchlorodisilanes of the formula $$Me_nSi_2Cl_{6-n}$$

26.9% silcarbanes of the formulae $$Me_n(SiCH_2Si)Cl_{6-n}$$
$$Me_n(SiCH_2CH_2Si)Cl_{6-n}$$
$$Me_n(SiCH_2SiCH_2Si)Cl_{8-n}$$

4.1% higher polymeric siloxanes, silanes and silcarbanes.

In the above compounds $n$ has an average value from 1 to 3 and all percentages are per cents by weight.

This material was treated with enough methanol to replace all the chlorine with methoxy groups. About 10 per cent of the theoretical amount of water needed to remove all the methoxy groups was then added. After removal of the resulting methanol, the product was a fluid having a viscosity of 9.2 cps. and a specific gravity of 1.063 both at 25° C.

Upon analysis, the material was found to contain: 27.1 per cent by weight methoxy groups, and 29.1 per cent by weight silicon and to have on the average about 1 alkyl group per silicon atom.

This material was diluted with xylene to give a solution containing 50 per cent by weight of the organosilicon compound. Samples of this solution were mixed with the various titanium esters in the amounts shown in the table below. In each case the resulting solution was coated on a glass plate and allowed to stand at room temperature. The drying time is the time required for the film to become tack-free to the touch and to set to a point where it could not be smeared by rubbing the finger across the surface.

*Table I*

| Titanium ester | Percent by wt. based on wt. of organosilicon composition | Drying time in hours |
| --- | --- | --- |
| Tetra 2-ethylhexyltitanate | 2 | 6 |
|  | 5 | 4 |
| Tetraoctadecyltitanate | 2 | 8 |
| Octylene glycolyl titanate [1] | 5 | 3 |
| Tetraisopropyltitanate | 5 | 2 |
| Tetrabutyltitanate | 2 | 4 |
| None |  | 72 |

[1] Titanium ester of octylene glycol containing 3 mols of alcohol residue per mol of titanium.

*Example 2*

Equivalent results are obtained when an organosilicon compound identical with that of Example 1 except that it contains 30 per cent by weight isopropoxy groups, is mixed with the titanium esters of Example 1 in the amounts stated in that example.

*Example 3*

When a polysiloxane having the composition 10 mol per cent monophenylsiloxane, 15 mol per cent monovinylsiloxane and 75 mol per cent monomethylsiloxane and having on the average .5 ethoxy groups per silicon atom is mixed with 10 per cent by weight tetrabutyltitanate in the manner of Example 1, an air-drying composition is obtained.

That which is claimed is:

1. A composition of matter comprising (1) a benzene soluble polymeric organosilicon composition having on the average from .9 to 1.5 monovalent hydrocarbon radicals per silicon atom and having on the average from .1 to 1.5 alkoxy groups per silicon atom, in which compound at least a major portion of the polymer linkages between the silicon atoms are SiOSi linkages any remaining polymer linkages being of the group consisting of SiSi and SiRSi linkages where R is a divalent hydrocarbon radical, and (2) from .02 to 1.5 per cent by weight titanium based on the weight of the organosilicon compound, said titanium being in the form of a benzene soluble titanic acid ester of an aliphatic alcohol of less than 20 carbon atoms.

2. A composition of matter comprising (1) a benzene soluble polymeric organosilicon compound having on the average from .9 to 1.5 alkyl radicals of less than 5 carbon atoms per silicon atom and having on the average from .1 to 1.5 alkoxy radicals of less than 5 carbon atoms per silicon atom, in which compound a major portion of the polymer linkages between the silicons are SiOSi linkages, the remaining polymer linkages being SiSi and SiRSi linkages where R is a divalent hydrocarbon radical of less than 3 carbon atoms and (2) from .02 to 1.5 per cent by weight titanium based on the weight of the organosilicon composition, said titanium being in the form of a benzene soluble titanic acid ester of an aliphatic alcohol of less than 20 carbon atoms.

3. A composition of matter in accordance with claim 1 wherein the titanic acid ester is tetrabutyltitanate.

4. A composition of matter in accordance with claim 2 wherein the titanic acid ester is tetrabutyltitanate.

5. A composition of matter in accordance with claim 1 wherein the titanic acid ester is selected from the group consisting of tetrabutyltitanate, tetraisopropyltitanate, octylene glycolyl titanate, tetraoctadecyltitanate and tetra-2-ethylhexyltitanate.

6. A composition of matter in accordance with claim 2 wherein the titanic acid ester is selected from the group consisting of tetrabutyltitanate, tetraisopropyltitanate, octylene glycolyl titanate, tetraoctadecyltitanatae and tetra-2-ethylhexyltitanate.

References Cited in the file of this patent

UNITED STATES PATENTS 2,512,058    Gulledge    June 30, 1950
2,647,880    Nitzsche    Aug. 4, 1953